Patented Apr. 21, 1936

2,037,910

UNITED STATES PATENT OFFICE 2,037,910

DYEING CELLULOSE ESTERS AND ETHERS

Arthur Howard Knight, Ashton-on-Mersey, England, assignor to Imperial Chemical Industries Limited, a corporation of Great Britain No Drawing. Original application June 2, 1933, Serial No. 674,122. Divided and this application July 3, 1935, Serial No. 29,729. In Great Britain June 9, 1932

8 Claims. (Cl. 8—5)

This invention relates to a process of dyeing cellulose ester and ether material, and to material so dyed, this application being divided out of my co-pending application Serial No. 674,122, filed June 2, 1933.

I have found that azo dyestuffs of the type obtainable by combining a diazo compound of the benzene or naphthalene series or a homolog or substitution product thereof which contains no sulpho-, carboxyl- or hydroxyl-group, with 1:3:5-xylenol dye cellulose esters and cellulose ethers in intense yellow to orange to orange brown shades. Those compounds of this series in which the diazo component possesses at least one nitro group are of particular interest, because the dyeings so obtained possess excellent fastness properties.

The dyestuffs of this series are sparingly soluble in water, and are applied to the fiber in the form of an aqueous suspension.

Suitable first components are aniline, o-chloroaniline, m-chloroaniline, p-chloroaniline, cresidine, p-phenetidine, o-anisidine, p-anisidine, o-toluidine, m-toluidine, p-nitroaniline, m-nitroaniline, o-nitroaniline, m-nitro-p-toluidine, o-chloro-p-nitroaniline, 5-nitro-2-anisidine, 4-nitro-2-anisidine, m-aminobenzenesulphonanilide, p-aminodimethylbenzamide, α-naphthylamine, or β-naphthylamine, but the invention is not limited to these components.

The invention is illustrated but not limited by the following examples in which the parts are by weight.

Example 1

The solution obtained by diazotizing 93 parts of aniline in the usual way is added slowly to a solution prepared by dissolving 122 parts of 1:3:5-xylenol in a solution of 4,800 parts of water and 40 parts of caustic soda, adding 208 parts of sodium carbonate and adjusting the temperature to 5° to 10° C. When combination is complete the dyestuff which is out of solution is filtered off, washed with water, and preserved as paste. It dyes cellulose acetate in golden orange shades of excellent fastness to light when applied, for example, as follows:

Enough of the dyestuff paste to contain one lb. of dyestuff is added to a lukewarm dyebath, and to this dyebath 100 lbs. of cellulose acetate yarn are then added. The temperature is raised to 80° C. during half an hour and the material is dyed for a further half an hour at this temperature. It is then washed and dried in the usual manner, giving a golden orange dyeing.

Example 2

137 parts of p-phenetidine are diazotized in the usual way and the solution so obtained added slowly to a solution of 1:3:5-xylenol prepared as in Example 1. When combination is complete the dyestuff which is out of solution is filtered off, washed with water, and preserved as paste.

It dyes cellulose acetate in reddish yellow shades of excellent light fastness when applied in the manner described in Example 1.

Example 3

The solution obtained by diazotizing 138 parts of p-nitroaniline in the usual way is added slowly to a solution of 1:3:5-xylenol prepared as in Example 1. The dyestuff so formed, which is out of solution, is filtered off, washed with water, and preserved as paste. It dyes cellulose acetate in reddish orange shades of very good light fastness.

Example 4

248 parts of m-aminobenzenesulphonanilide are diazotized in the usual way and the solution so obtained added slowly to a solution of 122 parts of 1:3:5-xylenol prepared as in Example 1. When combination is complete the dyestuff which is out of solution is filtered off, washed with water, and preserved as paste. It dyes cellulose acetate in orange shades of excellent fastness to light and washing when applied in the manner described in Example 1.

Example 5

168 parts of 5-nitro-2-anisidine are diazotized in the usual way and the solution so obtained added slowly to a solution of 122 parts of 1:3:5-xylenol prepared as in Example 1. When combination is complete the dyestuff, which is out of solution, is filtered off, washed with water, and preserved as paste.

It dyes cellulose acetate in yellowish orange shades of very good fastness to light and washing when applied in the manner described in Example 1.

Example 6

The solution obtained by diazotizing 143 parts of α-naphthylamine in the usual way is added slowly to a solution of 122 parts of 1:3:5-xylenol prepared as in Example 1. When combination is complete the dyestuff, which is out of solution, is filtered off, washed with water, and preserved as paste.

It dyes cellulose acetate in reddish orange shades of very good light and washing fastness when applied in the manner described in Example 1.

It will be understood that my invention is susceptible of wide variation and modification without departing from the spirit thereof.

I claim:

1. A process for coloring cellulose ester and cellulose ether materials, which comprises dyeing the same with an azo compound of the class obtainable by coupling a diazo-aryl compound of the benzene or naphthalene series, free of sulpho-, carboxy- or hydroxy- groups, with 1:3:5-xylenol.

2. A process for dyeing cellulose ester material which comprises applying thereto an aqueous suspension of an azo dye of the general formula

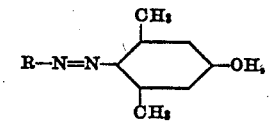

wherein R represents an aryl radical of the benzene or naphthalene series, free from sulpho-, carboxy- and hydroxy- groups, but containing at least one nitro group.

3. Cellulose ester and cellulose ether materials whenever dyed by an azo compound of the class obtainable by coupling a diazo-aryl compound of the benzene or naphthalene series, free of sulpho-, carboxy- or hydroxy- groups, with 1:3:5-xylenol.

4. Cellulose ester material when dyed with an azo dye of the general formula

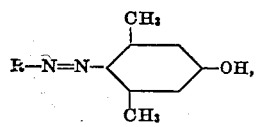

wherein R represents an aryl radical of the benzene or naphthalene series, free from sulpho-, carboxy- and hydroxy- groups, but containing at least one nitro group.

5. The process of dyeing cellulose acetate fibers which comprises applying thereto an aqueous suspension of the dyestuff obtainable by coupling diazotized p-nitro-aniline with 1:3:5-xylenol.

6. The process of dyeing cellulose acetate fibers which comprises applying thereto an aqueous suspension of the dyestuff obtainable by coupling diazotized 5-nitro-2-anisidine with 1:3:5-xylenol.

7. Cellulose acetate fibers when dyed with the dyestuff obtainable by coupling diazotized p-nitro-aniline with 1:3:5-xylenol.

8. Cellulose acetate fibers when dyed with the dyestuff obtainable by coupling diazotized 5-nitro-2-anisidine with 1:3:5-xylenol.

ARTHUR HOWARD KNIGHT.